Figure 1:
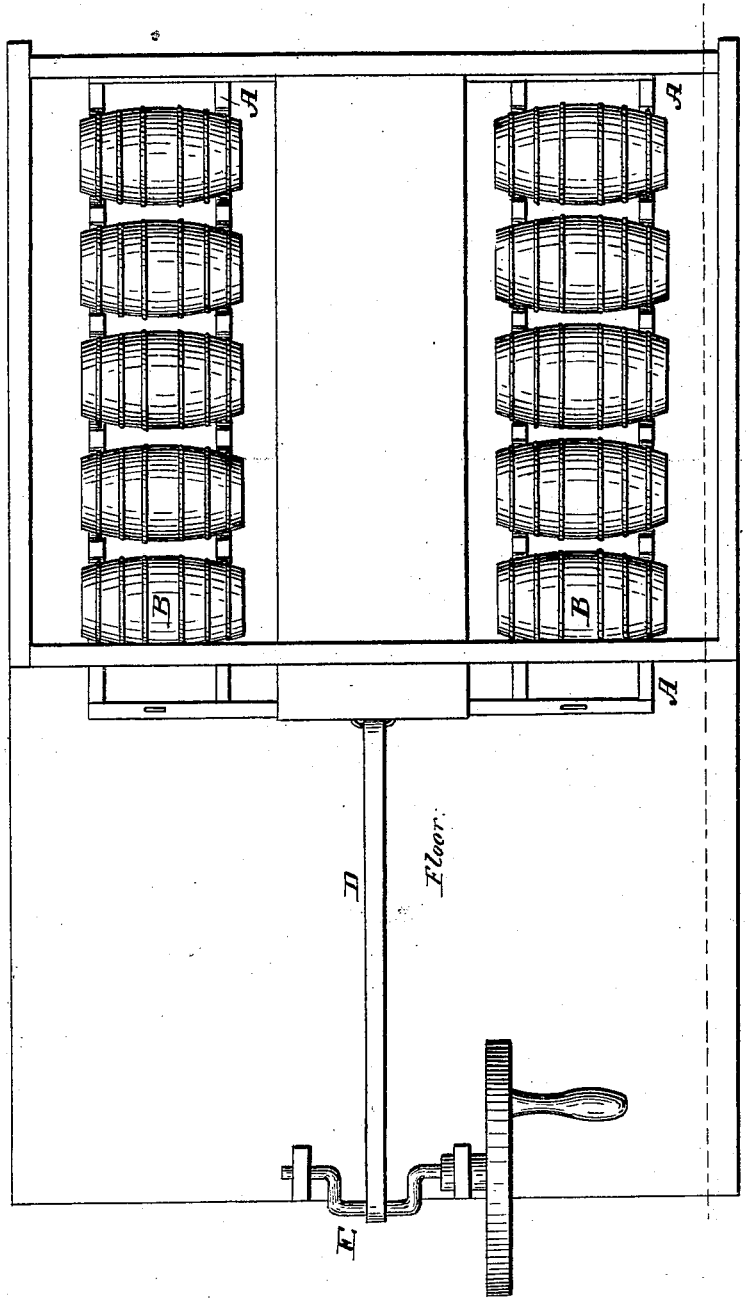

W. P. MARTIN.
Aging Liquors.

No. 95,703.

2 Sheets—Sheet 1.

Patented Oct. 12, 1869.

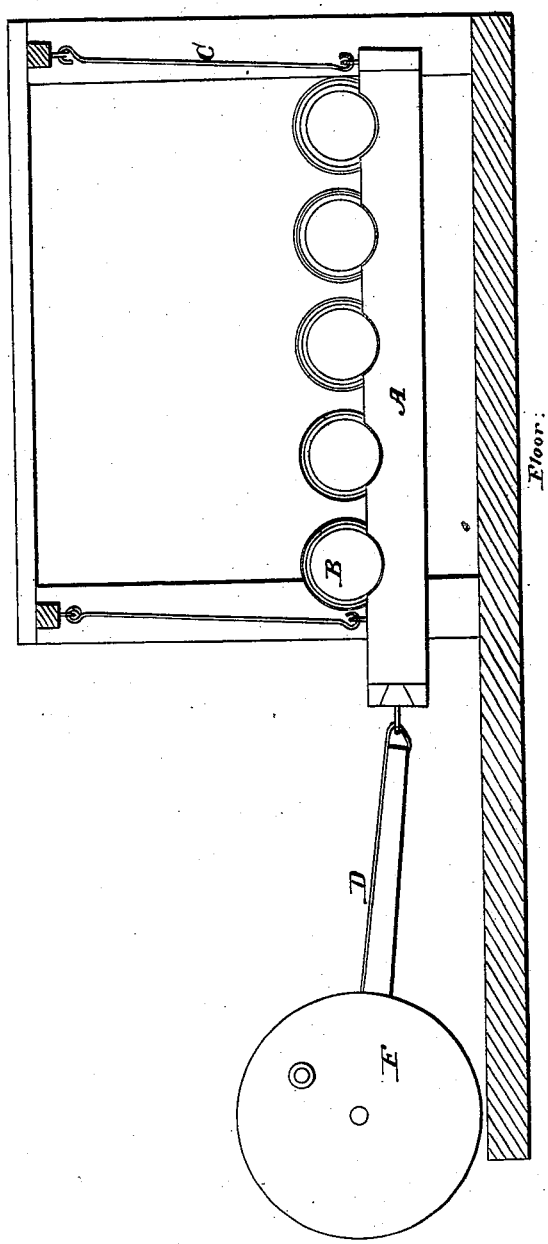

UNITED STATES PATENT OFFICE.

WILLIAM P. MARTIN, OF MILLERSBURG, KENTUCKY.

IMPROVED APPARATUS FOR IMPARTING AGE TO WHISKY AND OTHER SPIRITS.

Specification forming part of Letters Patent No. 95,703, dated October 12, 1869.

*To all whom it may concern:*

Be it known that I, WILLIAM P. MARTIN, of Millersburg, in the county of Bourbon and in the State of Kentucky, have invented a new and Improved Apparatus for Imparting Age to Whisky and other Spirits; and I do hereby declare that the following is a full, clear, and exact description thereof, reference being had to the accompanying drawings and the letters of reference marked thereon.

The nature of my invention consists in a movable frame or bed, made to contain any number of barrels of whisky desired, which is attached by means of chains or ropes to joists overhead. This movable frame or bed is then attached by a straight shaft to a wheel and axle, supported in an upright frame. The wheel is to be proportioned in size to the amount of power desired to be communicated. This machine is designed (by attaching a band to the wheel) to be run either by horse or steam power. This machine is so constructed that one hundred and fifty barrels of whisky can be kept in motion by the use of two-horse power.

To enable others to make and use my invention, I will proceed to describe its construction and operation by the accompanying diagram.

The letter A represents the movable frame or bed; letter B, the barrels; letter C, the chains or ropes attached to joists overhead; letter D, the shaft; letter E, the crank-axle; letter F, the wheel; G, the upright frame by which the wheel and axle are supported; letter H, the point at which the shaft D is attached to the movable bed F; letter I, the point at which the shaft D is attached to the axle E.

What I claim, and desire to secure by Letters Patent of the United States, is—

The swinging frame A, in combination with shaft D and crank-axle E, the whole operated as described.

The above specification signed by me this 6th day of August, 1869.

W. P. MARTIN.

Witnesses:
H. T. BATTERTON,
W. T. BOULDEN.